Figure 1:
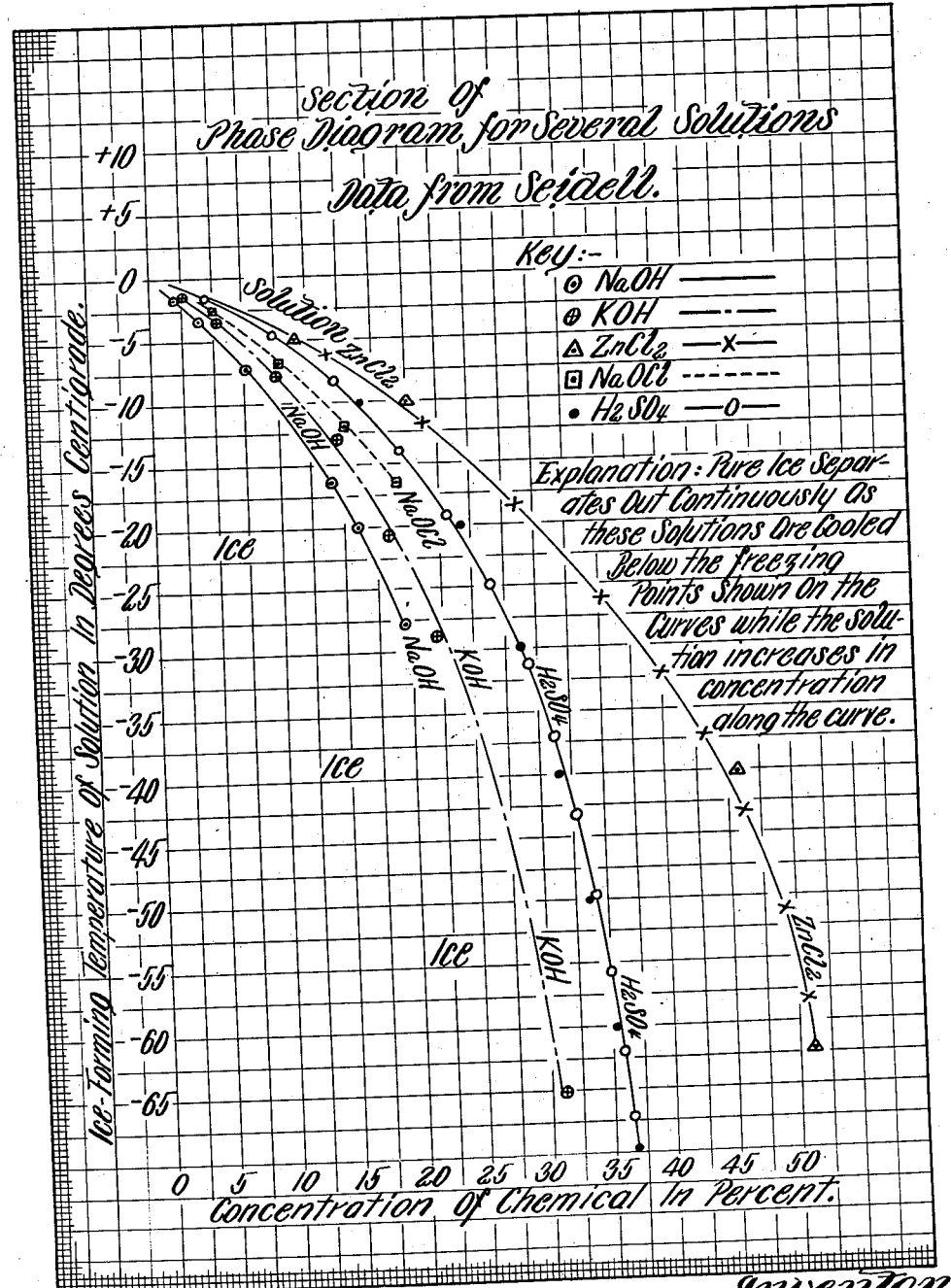

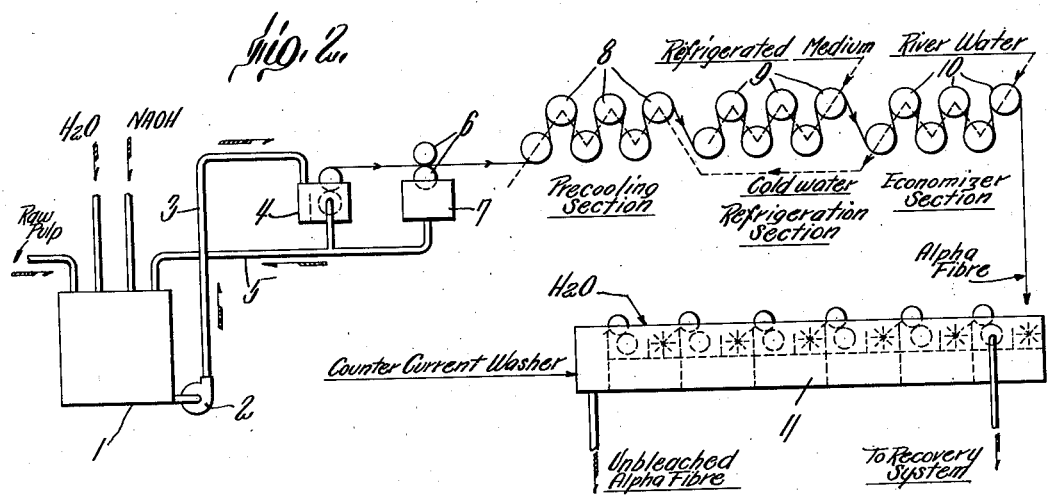
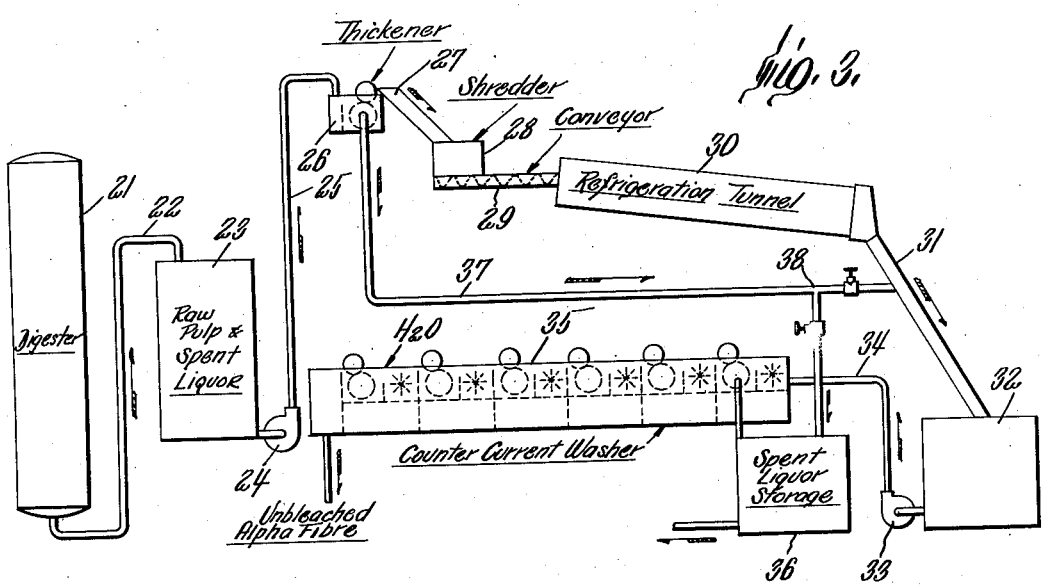

Patented May 24, 1932

1,859,891

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

METHOD OF EFFECTING REFINING REACTIONS ON CELLULOSIC PULPS

Application filed May 18, 1931. Serial No. 538,132.

This invention relates to a method of effecting reactions more particularly with that kind of chemical solution which when cooled below the freezing point gives up ice, while the solution itself undergoes an increase in chemical concentration.

It is well known that most chemical reactions are retarded by temperature lowering and by decrease in chemical concentration of the solution relied upon for effecting the reaction. I have found, however, that with the kind of chemical solution hereinbefore described, a decrease in temperature below the freezing point may in some cases be partly, completely, or more than offset by freezing out a proportion of the water. Indeed, those reactions, e. g., mercerization of cellulose fiber, which are favored in cold solutions, and those reactions which take place more selectively in cold solutions, may be carried out to great advantage in accordance with my invention, which comprehends starting with comparatively dilute reacting solutions and freezing out the desired amount of water from such solutions.

In Figure 1 of the accompanying drawings, are presented phase diagrams for typical dilute chemical solutions which upon cooling below the freezing point precipitate out ice and consequently undergo an increase in chemical concentration during such cooling. My invention applies to such chemical solutions but not to those which upon cooling more especially below the freezing point give up the chemical from solution rather than ice alone.

The value of the present invention, from a commercial standpoint, lies in that dilute chemical solutions, for instance, even those chemical liquors resulting from previous manufacturing operations, may be utilized for effecting certain desirable reactions. Thus, in the manufacture of kraft or soda pulps or in the purification of preliberated pulps, alkaline liquors are employed, so that the product is invariably associated with liquors which are regarded as being spent, or inactive, but which actually contain residual amounts of unspent or active alkali. By refrigerating the spent liquor along with the pulp to separate out sufficient ice, in accordance with the principles of the present invention, the concentration of active alkali in solution may be so vastly increased that the solution can refine the pulp, for instance, to an alpha cellulose content of as high as 96% to 97%,—assuming that the pulp was of lower alpha cellulose content before the refrigerating step. An important factor in these temperature regions below the freezing point is evidently the concentration of alkali dissolved in the alkaline liquor; and if such concentration is sufficiently high, refinement of the pulp takes place rapidly, selectively, and even to a greater degree than at temperatures above the freezing point. Some non-alpha cellulose impurities, like the pentosans, are especially soluble in alkaline liquors which have been refrigerated to temperatures below the freezing point. The refined pulps produced by my process are thus of low pentosan content, even though the initial pulp may be a kraft or soda pulp, which type of pulp in raw condition is of relatively high pentosan content, say, 5% to 10%.

With these and other features and objects in view, my invention will now be described in conjunction with the other accompanying drawings, wherein Figure 2 illustrates diagrammatically and conventionally apparatus for processing raw pulp.

Figure 3 is a similar representation of somewhat modified apparatus.

As depicted in Figure 2, I may start by delivering raw wood pulp, water, and alkali, such as caustic soda, into a mixing tank 1, wherein an intimate admixture of the various materials may be made. The resulting mixture may be, say, a 10% pulp suspension in a rather dilute caustic soda solution, say, one of 1% strength. The pulp suspension may be withdrawn from the mixing tank by a pump 2 and forced through a pipe 3 leading to a wet or cylinder machine 4 serving to form a sheet of pulp and to remove excess solution from the pulp. The excess solution may be returned by way of a pipe 5 to the tank 1, for admixture with other raw pulp. The sheet wet with caustic soda solution may be squeezed to the desired solution content by passage between a pair of squeeze rolls 6, the squeezed solution draining into a tank 7 and also being returned to the mixing tank 1 through the pipe 5. The squeezed sheet may then be passed over a bank of pre-cooling rolls 9, thence over a bank of refrigerating rolls 9, and finally over a bank of warming rolls 10. Through the warming rolls 10, water at seasonable temperature, e. g., river water, may be passed to thaw out the sheet and restore the solution therein to its original concentration. It is well to mention, at this point, that a sheet of pulp containing the solution is quite flexible, even when it is partially frozen, and may be passed over the roll peripheries without trouble. It is quite probable that the small ice crystals which form when the sheet is partially frozen allow it to remain suitably flexible for lapping or engaging curved surfaces over which it progressively passes. The effluent water from the rolls 10, as indicated, may be passed through the pre-cooling rolls, and thus serve to pre-cool the sheet practically to the freezing point. A suitable refrigerating medium at a temperature below the freezing point, such as a brine solution, may be passed through the rolls 9 to chill the sheet sufficiently to precipitate out ice crystals from the solution contained therein, and thus to concentrate the residual or unfrozen solution to the desired extent. In passing over the bank of refrigerating rolls, therefore, the sheet, by virtue of the concentrated solution associated therewith, becomes refined to high alpha cellulose content. The refined, thawed-out sheet coming from the rolls 10 may be shredded immediately before delivery into a countercurrent washing machine 11, at the pulp-intake end of which the solution washed from the pulp leaves for reuse or for recovery operations, and into the other end of which wash water is delivered just before the washed pulp is discharged.

In carrying out the foregoing procedure, the alkali content of the sheet may be adjusted by controlling the pressure exerted on the sheet in the wet machine and/or at the squeeze rolls. The amount of caustic soda retained by the sheet, as well as the temperature to which chilling is subsequently effected, determines the extent of refinement to be realized in the fiber. When a caustic soda solution of about 1% strength is used, the sheet as delivered from the squeeze rolls may have a solution content of about 80%, or even greater, but when stronger solutions are employed, the sheet may be squeezed to lower solution content. Under such conditions, the raw pulp may be refined to an alpha cellulose content of from 92% to 97%, depending upon the alkali content of the sheet, the low temperatures to which it is subjected, and the time of treatment at such temperatures. If desired, rather than starting with bulk pulp, a preformed sheet of pulp may be soaked with the alkaline solution, then adjusted in solution content, and subjected to the steps already described. The refined, partially frozen sheet may be thawed out and washed as such in a single operation, by the use of wash water at seasonable temperature or wash water which has been heated to the desired temperature. If desired, the shredding of the sheet may be performed even before cooling or refrigeration, in which case, refrigeration may be performed as by delivering the shredded fiber and its included alkaline solution into a revolving drum jacketed with a refrigerating medium or otherwise chilled, whereupon the shredded and refined fiber in partially frozen condition may be thawed out as in another revolving drum provided with suitable heating means. The thawed-out mass may be washed free of alkaline solution, and finally bleached.

The raw pulp may be handled as pulp throughout the process, particularly when it is to be processed by the very same liquor in which the pulp was liberated from raw cellulosic material such as wood. Such a procedure is, for instance, applicable in the case of kraft pulp which is liberated in a solution containing caustic soda and sodium sulphide, and in the case of soda pulp which is produced in a straight caustic soda solution. In both these instances, the so-called spent liquors still contain substantial amounts of residual active alkali, but such alkali exists in comparatively dilute solution. As shown in Figure 3, the liberated pulp, together with the spent liquor from the digester 21 in which cooking was accomplished, may be passed through a pipe 22 into a storage tank 23. A pump 24 may be provided for removing the pulp and liquor from the tank 23 and passing it through a pipe 25 to a thickener 26. The pulp, which may be at a consistency of about 10% as it issues from the digester, can be thickened to the desired consistency, say, 5% more or less, and economically refrigerated as such. The thickened pulp may be delivered from the thickener 26 through a chute 27 into a shredder 28, from which the shredded pulp is fed as by a worm conveyor 29 into a tunnel 30. The tunnel 30 may be internally refrigerated by suitable means, to freeze out a portion of the water in the thickened pulp, as it is carried through the tunnel. The refining of the pulp is thus accomplished by the increased strength of solution associated therewith as part of the water is frozen out of the solution. The partially frozen mass may be delivered from the tunnel 30 into a sluice 31 leading into a storage tank 32. On its way to the storage tank, the mass may be thawed out, as by admixture with a portion of the spent liquor supplied from the thickener 26, as indicated in Figure 3. If desired, thawing, of the mass may be accomplished by introducing steam or water thereinto, but the use of spent liquor for this purpose avoids undesirable dilution of the chemical associated with the pulp, and thus facilitates subsequent chemical recovery operations. The refined pulp is removed from the tank 32 by a pump 33 and sent through a pipe 34 to the intake end of a countercurrent washing machine 35, from which, as shown, the effluent spent liquor proceeds to a storage tank 36. The tank 36 may also constitute the receptacle for such excess spent liquor which is available from the thickener 26, and which, as indicated, flows to the tank from the thickener by way of a pipe 37 having a valved branch 38 serving to permit diversion of the necessary amount of spent liquor to the sluice 31. The liquor may be withdrawn from the tank 36 for reuse or for the recovery of chemicals as customarily practised in either the kraft or soda processes.

Instead of processing a pulp as it comes from the digester together with the spent liquor of digestion, the pulp may be separated from the spent liquor, as ordinarily, by washing, then screened, and subjected to an initial chemical treatment, for instance with chlorine water, or with bleach liquor. Such pretreatment removes ligneous groups in the pulp or activates them for removal by the alkaline liquor. The pretreated pulp may be washed and then admixed with the separated spent liquor or with fresh liquor, whereupon the pulp-liquor may undergo treatment as hereinbefore described.

When a raw pulp has been subjected to refinement in a dilute alkaline liquor at elevated temperature or in a more concentrated solution at room temperature or at any other temperature above freezing, the principles of the present invention may be applied after the initial refinement has been completed. For example, a raw sulphite pulp may, by digestion at elevated temperature in a dilute caustic soda solution (e. g., one of about 1% strength), be converted into a refined product having an alpha cellulose content up to about 94.5%. So, too, such a pulp may be similarly refined in a caustic soda solution of 5% or greater strength, at room temperature or other temperatures above freezing. The refined pulp may, in accordance with the present invention, then be further refined by freezing out a sufficient proportion of the water associated with its refining solution. Even when the refining solution in contact with the pulp is of only 0.2% to 0.5% strength as a result of previous use and/or dilution with wash water, the chilling of the solution to the proper point to freeze out water will be attended by an increase in alpha cellulose content of the pulp to upwards of 96%.

If desired, the refining liquor may contain oxidizing or bleaching agents, such as sodium hypochlorite, or reducing agents, such as sodium sulphide. In this connection, it is to be noted that the so-called "white liquor" of a kraft mill which contains both caustic soda and sodium sulphide may be advantageously employed, especially when the pulp to be refined is high in lignin content. The sodium sulphide promotes the removal of ligneous matter from the pulp and tends to preserve optimum papermaking characteristics therein. In progressively freezing such a liquor, the sodium sulphide crystallizes out before the caustic soda, so that when the temperature is lowered beyond a given point for a particular liquor, the ratio of caustic soda to sodium sulphide is progressively increased. The use of oxidants, such as sodium hypochlorite, in a caustic soda solution used for refining pulp also favors the elimination of ligneous and coloring matter from the pulp. While the sodium hypochlorite may be used in amount subordinate to the caustic soda, yet, on the other hand, the sodium hypochlorite may be the main chemical in solution, and thus cause a marked bleaching, as well as refinement, of the pulp when the water content of the pulp-liquor mixture is partly eliminated by freezing. Thus, I may use a liquor containing, say, 10% or more sodium hypochlorite and, say, 0.5% or less caustic soda in solution before the freezing step, and have as my objective a fully bleached, as well as refined, pulp as the finished product, even though I start with a commercial unbleached pulp of the type of sulphite. Or the step of bleaching with a bleach liquor whose chemical concentration has been increased by partial precipitation of the water content of the liquor as ice may succeed a straight refining step carried out pursuant to my novel process or to prior art practice.

In producing a refined cellulose pulp adapted for paper making, it is desirable to avoid mercerization of the fiber, as mercerized fiber does not lend itself readily to formation as a uniform sheet on machinery of the papermaking type; and even when special precautions are observed to effect uniform formation, the resulting paper sheet is of poor strength and other physical characteristics. Mercerization of the fiber can, however, be avoided by freezing out water from a caustic soda or equivalent alkaline solution to produce a solution strength lower than that which causes the mercerization of the fiber. When mercerization of the fiber is not objectionable, however, but may in fact be desirable, as when the fiber is to be converted into cellulose derivatives, water may be eliminated from the solution by freezing until a solution of mercerizing strength is attained. At freezing temperatures, it is, however, possible to effect mercerization with solutions of considerably lower strength than at above freezing temperatures.

As the cellulosic fibrous material to be refined by my process, I have already enumerated the usual commercial wood pulps, viz., kraft, soda, and sulphite pulp. These pulps may be refined in partly or in completely bleached condition. Other chemical wood pulps, such as those produced by cooking in neutral alkaline sulphite liquors, mechanical wood pulp, comminuted wood, wood pulps derived from soft woods, such as spruce and fir, wood pulps of high pentosan content derived from hardwoods, such as beech and maple, cotton and linen fibers, bass fibers, derived from raw cellulosic materials such as hemp, jute, bamboo, etc., are included within the purview of the cellulosic fibrous materials which may be treated by my process. I do not intend to limit myself to caustic soda as the refining alkali, but mean to include other alkalies which act like caustic soda in my process.

I am aware of the fact that it has been proposed to form cellulose solutions or solutions of cellulose derivatives, such as cellulose xanthate, in refrigerated chemical liquors. My objective is, however, entirely different, in that I use chemical solutions, e. g., solutions of caustic soda, bleach, sodium sulphide, etc., under conditions of concentration and amount of solution, as well as temperature and time of treatment, to react practically selectively upon the non-alpha cellulose impurities present in the cellulosic fibrous material, without effecting a significant solution of the fibers. The refined fibrous material may then be washed free from the refining solution and the dissolved-out impurities. The pulp is therefore substantially preserved in solid condition, and, because it is refined, can serve advantageously for papermaking, as well as for making high grade cellulose derivatives.

In the appended claims, I use the expression "chemical liquor capable of refining" as being inclusive of alkaline liquors, bleach liquors, or other chemical liquors which under suitable conditions of concentration are capable of reacting upon and dissolving non-alpha cellulose impurities, such as beta and gamma celluloses and ligneous and coloring matter, from cellulosic fibrous material while at the same time preserving the fibrous material in solid condition.

I claim:

1. A process which comprises treating cellulosic fibrous material with a chemical liquor capable of refining such material, freezing out a portion of the water from such liquor to increase its chemical concentration and its refining activity while substantially preserving the fibrous material in solid condition, and thawing out and washing the refined fibrous material free from chemical liquor.

2. A process which comprises treating cellulosic fibrous material with an alkaline liquor, freezing out a portion of the water from such liquor to increase its alkalinity and its refining activity while substantially preserving the fibrous material in solid condition, and thawing out and washing the refined fibrous material free from chemical liquor.

3. A process which comprises treating cellulosic fibrous material with a caustic soda solution, freezing out a portion of the water from such solution to increase its causticity and refining activity while substantially preserving the fibrous material in solid condition, and thawing out and washing the refined fibrous material free from chemical liquor.

4. A process which comprises treating cellulosic fibrous material with a solution of caustic soda and another chemical capable of refining such material, freezing out a portion of the water from the solution to increase its concentration of caustic soda and of other chemical and its refining activity while substantially preserving the fibrous material in solid condition, and thawing out and washing the refined fibrous material free from solution.

5. A process which comprises treating cellulosic fibrous material with a solution of caustic soda and sodium sulphide, freezing out a portion of the water from such solution to increase its causticity and sulphidity and its refining activity while substantially preserving the fibrous material in solid condition, and thawing out and washing the refined fibrous material free from solution.

6. A process which comprises treating cellulosic fibrous material with a solution of caustic soda and an oxidant, freezing out a portion of the water from such solution to increase its causticity and oxidant content and its refining activity while substantially preserving the fibrous material in solid condition, and thawing out and washing the refined fibrous material free from solution.

7. A process which comprises treating cellulosic fibrous material with a solution of caustic soda and sodium hypochlorite, freezing out a portion of the water from such solution while substantially preserving the fibrous material in solid condition, and thawing out and washing the treated fibrous material free from solution.

8. A process which comprises treating unbleached cellulosic fibrous material with a bleach liquor, freezing out a portion of the water from said liquor to increase its concentration, and thawing out and washing the treated fiber free from bleach liquor.

9. A process which comprises treating cellulosic fibrous material with an alkaline bleach liquor, freezing out a portion of the water from said bleach liquor to increase its alkalinity and concentration of bleach while substantially preserving the fibrous material in solid condition, and thawing out and washing the treated fiber free from bleach liquor.

10. A process which comprises treating cellulosic fibrous material with a solution of alkali too weak to refine such material at room temperature, freezing out a portion of the water to increase the alkalinity of such solution sufficiently to effect a refinement of the fibrous material while substantially preserving it in solid condition, and thawing out and washing the refined fibrous material free from solution.

11. A process which comprises treating cellulosic fibrous material with a solution of alkali too weak to mercerize such fiber at above freezing temperatures, freezing out a portion of the water to increase the alkalinity of such solution sufficiently to mercerize such material while substantially preserving it in solid condition, and thawing out and washing the mercerized product free from solution.

12. A process which comprises pulping raw cellulosic material in an alkaline liquor to produce a pulp associated with spent liquor containing residual active alkali, freezing out a portion of the water from such spent liquor while associated with such pulp to increase the concentration of active alkali and thereby to refine such pulp, and thawing out and washing the pulp free from liquor.

13. A process which comprises pulping raw cellulosic material in a liquor containing caustic soda to produce a pulp associated with spent liquor containing residual active caustic soda, freezing out a portion of the water from such spent liquor while associated with such pulp to increase the causticity of such liquor and thereby to refine such pulp, and thawing out and washing the pulp free from liquor.

14. A process which comprises pulping raw cellulosic material in a liquor containing caustic soda and sodium sulphide to produce a pulp associated with spent liquor containing residual active caustic soda and sodium sulphide, freezing out a portion of the water from such spent liquor while associated with such pulp to increase causticity and sulphidity and thereby to refine such pulp, and thawing out and washing the pulp free from liquor.

15. A process which comprises treating cellulosic fibrous material with a chemical refining liquor at above freezing temperature until no more refining action can be effected in such liquor under such temperature condition, freezing out a portion of the water from the spent refining liquor to increase the concentration of residual active chemical therein, and thereby to effect a further refinement of the fibrous material, and thawing out and washing said refined pulp free from spent refining liquor.

16. A process which comprises refining a preliberated cellulose pulp in an alkaline liquor at above freezing temperature until no more refining can be effected under such temperature condition, then freezing out a portion of the water from the refining liquor to increase the concentration of the residual alkali in such liquor and thereby to effect a further refinement of such pulp, and thawing out and washing said refined pulp free from spent refining liquor.

In testimony whereof I have affixed my signature.

GEORGE A. RICHTER.